United States Patent
Sasaki

[11] 3,909,166
[45] Sept. 30, 1975

[54] OIL SEAL MEANS OF A ROTARY PISTON ENGINE

[75] Inventor: Yoshio Sasaki, Toyota, Japan

[73] Assignee: Toyota Jidosha Kogyo Kabushiki Kaisha, Japan

[22] Filed: Dec. 18, 1973

[21] Appl. No.: 425,700

[30] Foreign Application Priority Data
Sept. 25, 1973 Japan.............................. 48-107698

[52] U.S. Cl. ............................................... 418/142
[51] Int. Cl.² ....................... F03C 3/00; F04C 27/00
[58] Field of Search ............ 418/140, 142; 277/142, 277/182, 183

[56] References Cited
UNITED STATES PATENTS

| | | | |
|---|---|---|---|
| 2,819,106 | 1/1958 | Voorhees............................ | 277/182 |
| 3,306,620 | 2/1967 | Taschenberg....................... | 277/183 |
| 3,782,869 | 1/1974 | Steinwart............................ | 418/142 |
| 3,802,812 | 4/1974 | Ruf...................................... | 418/142 |

FOREIGN PATENTS OR APPLICATIONS
162,049   3/1955   Australia............................ 277/182

Primary Examiner—William L. Freeh
Assistant Examiner—Louis J. Casaregola
Attorney, Agent, or Firm—Stewart and Kolasch, Ltd.

[57] ABSTRACT

An oil seal means of the rotary piston engine adapted to maintain oil and gas tightness between a side wall portion of a rotor and an inner wall of the side housing, wherein the oil seal ring to be mounted in an annular oil seal groove formed as cut at the side wall portion of the rotor has a L-shaped cross section and is formed into a unitary member having a substantially U-shaped cross section by being combined together with a rubber annular lip member having a L-shaped cross section and bonded to an annular flanged portion of the oil seal ring, said annular lip member being pressed onto a side wall portion of the annular oil seal groove at its free edge portion by a spring ring.

8 Claims, 3 Drawing Figures

OIL SEAL MEANS OF A ROTARY PISTON ENGINE

BACKGROUND OF THE INVENTION

1. Field of the Invention:

This invention relates to an oil seal means of a rotary engine, and more particularly, an oil seal means mounted at a side wall portion of a rotor to keep oil and gas tightness between the side wall portion of the rotor and a side housing of a rotary piston engine.

2. Description of the Prior Art:

Conventionally, the oil seal means for the abovementioned purpose generally has a structure as shown in FIG. 1. Referring to FIG. 1, reference numerals 1 and 2 designate a rotor and a side housing, respectively, and a side wall of the rotor confronting the side housing is provided with an annular oil seal groove 3 formed as cut to produce the oil seal means between the rotor and the side housing. Within the annular oil seal groove, there is mounted an oil seal ring 4 having a cross sectional shape as shown in FIG. 1 with interposition of a spring 5 (generally a corrugated annular spring) which is adapted to exert a spring force at rear face portions of the oil seal ring to resiliently urge said ring outwardly from the annular oil seal groove 3 so that the oil seal ring 4 is in close abutment with the inner wall of the side housing at its front face so as to maintain oil and gas tightness at the contacting position. On the other hand, in order to intercept a fluid passage crossing an annular space left between the oil seal ring 4 and the walls of the annular oil seal groove 3, there is provided an annular elastic sealing member 6 such as an O-ring, which is usually mounted either in a groove formed in the oil seal ring 4 as shown in FIG. 1, or in a groove (not shown) formed along a wall portion of the annular oil seal groove 3 to be further lowered therefrom.

However, in the conventional oil seal means having a structure as shown in FIG. 1, the rigidity of the oil seal ring is relatively so high that the followability of the oil seal ring to the side housing according to the rotation of the rotor is poor, and therefore, possesses the problem that its performance of maintaining oil and gas tightness between the tip portion of the oil seal ring and the inner wall of the side housing is poor, causing a large consumption of the lubricating oil.

Furthermore, in the conventional structure of the oil seal means, there exists another problem due to two contradictory requirements. Since on one hand, the oil seal ring has to be mounted in the annular oil seal groove so as to be freely slidable in the axial directions of the rotor, the annular elastic sealing member 6 also has to be slidable over the wall surface of the annular oil seal groove or the surface of the oil seal ring, and accordingly, the degree of pressing contact between the annular elastic sealing member 6 and the wall surface of the annular oil seal groove or the surface of the oil seal ring must be maintained at a moderate value so as to allow a freely slidable relative movement therebetween. On the other hand, the oil and gas leakage which occurs by crossing a fluid passage left between the wall portions of the annular oil seal groove and the surface of the oil seal ring must be checked by tightly intercepting the annular passage by the annular elastic sealing member 6 being tightly pressed onto the wall surface of the annular oil seal groove as well as the surface of the oil seal ring, the degree of pressing contact between the annular elastic sealing member 6 and the wall of the annular oil seal groove and the surface of the oil seal ring preferably being as high as possible. It has not been possible to satisfactorily accomplish these two contradictory conditions by means of a conventional annular elastic sealing member such as O-ring which can not be said to have softness sufficient to absorb dimensional variations due to thermal expansion, etc., thus causing either a poor followability of the oil seal ring to the side housing or a leakage of oil or gases around the annular elastic sealing member.

Still furthermore, in the conventional structure, there has been a problem that when the annular sealing member 6 has been deformed or twisted due to a deterioration of its material, its performance of maintaining oil and gas tightness is very much reduced, causing a heavy leakage of oil and gases.

SUMMARY OF THE INVENTION

Therefore, it is the object of this invention to solve the abovementioned problems in the conventional oil seal means and to provide an improved oil seal means in which the followability of the oil seal ring to the inner wall of the side housing is improved by increasing the softness of the oil seal ring and by incorporating therewith another annular elastic sealing member which is richer in softness than the conventional annular elastic sealing member of the O-ring type, so as to improve the followability of the oil seal ring while at the same time improved its oil and gas tightness.

The abovementioned object is accomplished, according to this invention, by providing an oil seal means of a rotary piston engine comprising an oil seal ring having a L-shaped cross section and mounted in an annular oil seal groove formed as cut at a side wall portion of a rotor, an annular rubber lip member having a I-shaped cross section and attached to said oil seal ring in a manner to extend said L-shaped cross section to have a substantially U-shaped cross section, a spring ring resiliently pressing the free edge portion of said lip member onto a side wall portion of said annular oil seal groove, and a spring means resiliently pressing said oil seal ring outwardly from said annular oil seal groove towards the inside wall of a side housing of the engine.

In the oil seal means of the abovementioned structure, the oil seal ring having a L-shaped cross section has a high softness which is favorable to obtaining a good followability of the oil seal ring to the inside wall of the side housing according to the rotation of the rotor. Furthermore, by employing an annular lip member made of rubber and having an I-shaped cross section attached to the oil seal ring having the L-shaped cross section said L-shaped cross section is extended to have a substantially U-shaped cross section and by resiliently pressing the free edge portion of said lip member onto a side wall portion of said annular oil seal groove by means of the spring ring, the annular elastic sealing member intercepts the fluid passage crossing the annular space left between the oil seal ring and the wall portions of the annular oil seal groove. The annular lip member can be made to be a highly resilient structure, whereby the resistance exerted by the annular elastic sealing member on the oil seal ring against its displacement is lessened, whereby the followability of the oil seal ring to the inner wall of the side housing is very much improved, while the increased softness of the annular elastic sealing member can constantly maintain a high performance of keeping oil and gas tightness by effectively intercepting the fluid passage crossing said annular space.

The structure of the oil seal means according to this invention is a replacement of the conventional oil seal ring by a combination of an oil seal ring having a L-shaped cross section and a lip member having a I-shaped cross section, said combination presenting a U-shaped cross section, and therefore, the oil seal means according to this invention can show overall cross sectional dimensions which are substantially equivalent to or rather smaller than those in the conventional oil seal means, and in addition, the structure is simple enough to be comparable with one of the simplest conventional structures as shown in FIG. 1.

According to a modification of the oil seal means of this invention, there may be further provided a second oil seal ring having a L-shaped cross section and adapted to support said first mentioned oil seal ring by way of said spring means, and a second spring means resiliently pressing said second oil seal ring onto the inside wall of said side housing. By such a dual combination structure of the oil seal rings having L-shaped cross sections, there are obtained duplicate contacting portions for maintaing the oil and gas tightness between the oil seal ring and the inner wall of the side housing, whereby there is obtained a much improved performance of maintaing oil and gas tightness. In this case, it is to be appreciated that it does not substantially increase the dimentions of the cross sectional structure of the oil seal means by laying one oil seal ring having a L-shaped cross section over the other, and thus a very compact structure of an oil seal means of a duplicate oil seal ring type can be obtained.

According to a particular feature of this invention, the free edge portion of said lip member may preferably be formed with a channel-like portion so that its concaved side receives said spring ring while its convexed side is abutted onto a side wall portion of the annular oil seal groove.

Furthermore, said annular rubber lip member may have an enlarged annular edge portion of a thickness substantially equal to the width of an annular flanged portion of said oil seal ring and may be bonded to said annular flanged portion at said enlarge annular edge portion.

The spring means resiliently supporting the oil seal ring may be a corrugated spring adapted to resiliently support said annular flanged portion of the oil seal ring of the L-shaped cross section.

DESCRIPTION OF THE PREFERRED EMBODIMENT

In the following, this invention will be described in more detail of the preferred embodiment with reference to the accompanying drawing.

Figure 1:
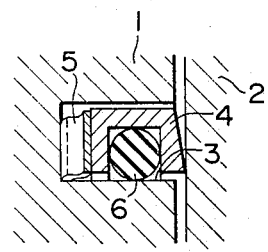
FIG. 1 is a cross sectional view showing an example of the conventional structures of oil seal means of a rotary piston engine.
Figure 2:
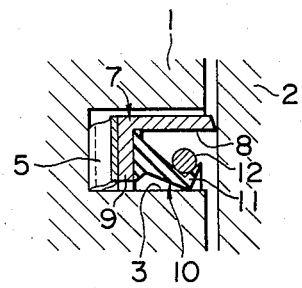
FIG. 2 is a cross sectional view corresponding to FIG. 1 but showing an embodiment of the oil seal means according to this invention.

Referring to FIG. 2 showing an embodiment of the oil seal means according to this invention in a similar cross sectional view as FIG. 1, the portions corresponding to those shown in FIG. 1 are designated by the same reference numerals. In FIG. 2, 7 is an oil seal ring which is provided according to this invention. The oil seal ring has a L-shaped cross section, which is positioned in the annular oil seal groove 3 to be slidable over a side wall portion thereof with its portion 8 corresponding to one leg of the L-shaped cross section. The oil seal ring is adapted to be pressed onto the inner wall of the side housing 2 at the tip end portion of said leg portion 8 thereby maintaining oil and gas tightness at the contacting portion. A portion 9 corresponding to another leg portion of the L-shaped cross section is supported by the bottom wall of the annular oil seal groove 3 by way of the corrugated annular spring 5 which serves to urge the portion 8 onto the inner wall of the side housing 2 under the resiliency afforded by the L-shaped cross sectional structure of the oil seal ring. From the portion 9 of the oil seal ring 7 is extended an annular lip member 10 made of rubber and having a I-shaped cross section, said annular lip member 10 being bonded to the portion 9. The annular lip member together with the oil seal ring 7 having the L-shaped cross section provides a unitary member having a substantially U-shaped cross section. A free edge portion 11 of the annular lip member 10 is formed slightly in a hooked shape in its cross section and adapted to engage with a spring ring 12 at the hooked portion so that the annular lip member 10 is resiliently pressed onto a wall portion of the annular oil seal groove 3 at the free edge portion 11, whereby a fluid passage crossing an annular space left between the oil seal ring 7 and the walls of the annular oil seal groove 3 is effectively intercepted.

Figure 3:
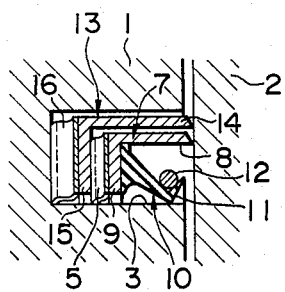
FIG. 3 is a view corresponding to FIG. 2 but showing a modification of the embodiment shown in FIG. 2.

FIG. 3 shows another embodiment of the oil seal means according to this invention in a cross section similar to FIG. 1 or 2 together. The structure shown in FIG. 3 includes the structure shown in FIG. 2 as a part thereof, and accordingly, the portions in FIG. 3 corresponding to those shown in FIG. 2 are designated by the same reference numerals. In the structure shown in FIG. 3, the portion 8 of the oil seal ring 7 having a L-shaped cross section is overlaid with a portion 14 corresponding to a leg portion of a second oil seal ring 13 having a similar L-shaped cross section. The other leg portion 9 of the oil seal ring 7 is supported by another leg portion 15 of the oil seal ring 13 by way of a corrugated annular spring 5. The leg portion 15 of the oil seal ring 13 is supported by the bottom wall of the annular oil seal groove 3 by way of another corrugated annular spring 16. In this structure, the oil seal rings 7 and 13 are supported in the manner to be independently movable in the direction of the rotor axis under the action of the corrugated annular springs 5 and 16, whereby the tip end portions of the leg portions 8 and 14 of the respective oil seal rings can independently follow the inner wall of the side housing, thus providing a duplicate effect of maintaining oil and gas tightness. It is to be appreciated that the structure of the oil seal means shown in FIG. 3 has only slightly larger dimensions than the structure shown in FIG. 2 in spite of the abovementioned duplicate effect of maintaining oil and gas tightness.

I claim:

1. An oil seal means of a rotary piston engine comprising an oil seal ring of L-shaped cross-section having first and second leg portions, said oil seal ring being mounted in an annular oil seal groove of substantially rectangular cross-section and formed as a cut in a side wall portion of a rotor, said annular oil seal groove having first and second side wall and a end wall, the first leg portion of the oil seal ring being positioned substantially parallel with the first side wall of said oil seal groove, and the second leg portion of the oil seal ring extending substantially parallel to the end wall of the oil seal groove, an annular resilient lip member having a first end bonded to the second leg portion of said oil seal ring and a second end adapted to be pressed into the second side wall of said oil seal groove, a ring spring operatively associated with the second end of the resilient lip member for pressing said second end of said resilient lip member into said second side wall of said groove, and a spring means positioned between the end wall of the oil seal groove and the second leg portion of the oil seal ring.

2. The oil seal means of claim 1, wherein the annular resilient lip member is a rubber member.

3. The oil seal element of claim 1, wherein the second end of the annular resilient lip member is formed into a hooked shape to positively receive said ring spring in said operative association.

4. The oil seal means of claim 1, wherein said annular lip member is thickened at said first end to be substantially as thick as the length of said second leg portion of said oil seal ring.

5. The oil seal means of claim 1, wherein the spring means is a corrugated spring.

6. The oil seal means of claim 1, further comprising another oil seal ring of L-shaped cross-section having first and second leg portions, said another oil seal ring being disposed between the first oil seal ring and the oil seal groove in a manner such that the first leg portions of said two oil seal rings are substantially laid one over the other and the second leg portions of said two oil seal rings are positioned with said spring means being disposed therebetween, and another spring means disposed between the end wall of the oil seal groove and said second leg portion of the second oil seal ring.

7. The oil seal means of claim 1, wherein the first leg portion of the oil seal ring is in engaging relationship with a side house of the rotary piston engine.

8. The oil seal means of claim 6, wherein the first leg portion of both oil seal rings are in engaging relationship with a side housing of the rotary piston engine.

* * * * *